Patented Feb. 28, 1939

2,148,894

UNITED STATES PATENT OFFICE 2,148,894

SHAPED CELLULOSE ARTICLE

Wilhelm Becker, Cologne-Mulheim, Otto Bayer, Leverkusen, and Walter Harz, Dormagen, Germany, assignors to I. G. Farbenindustrie Aktiengesellschaft, Frankfort-on-the-Main, Germany No Drawing. Application September 15, 1936, Serial No. 100,897. In Germany September 28, 1935

4 Claims. (Cl. 18—54)

The present invention relates to the manufacture of shaped articles from cuprammonium cellulose solutions.

On precipitating cellulose from its ammoniacal copper oxide cellulose solutions with aqueous precipitating liquids often the formation of solid cupric hydroxide which settles in the precipitating funnel is to be observed which renders a continuous working extremely difficult. It has been found that the formation of the cupric hydroxide may be prevented by performing the precipitation of the cellulose in the presence of acid esters of polyvalent alcohols or water soluble salts thereof.

As polyvalent alcohols there come, for instance, into consideration glycol, glycerine, erythrite, mannite, sorbite or the like. As polybasic acids phosphoric acid, sulfuric acid, boric acid, oxalic acid, phthalic acid etc. may be mentioned. The preparation of the esters is carried out according to the usual esterification methods.

The acid esters may be added as such or after neutralization to an ammoniacal copper oxide cellulose solution, or they may be added to the aqueous precipitating bath. Generally quantities of from 1 to 10% calculated on the weight of the cellulose are sufficient for preventing the precipitation of cupric hydroxide; but also larger or smaller quantities may be added. It is surprising that the substances used in accordance with the invention in spite of their nature as esters retain their efficacy in the alkaline reacting cellulose solution for a long time.

The following examples illustrate the invention without, however, restricting it thereto, the parts being by weight:

Example 1

To an ammoniacal copper oxide cellulose solution with a cellulose content of 7.5%, an ammonia content of 8% and a copper content of 3.6%, 7 parts of glycerophosphoric acid in the form of the sodium salt are added to each 100 parts of cellulose. In order to evenly distribute the added ester the solution is stirred, and after the usual evacuating process is spun into artificial silk. The sedimentation of solid copper compounds at the glass walls of the spinning funnel in this case is much lower than while spinning without any addition. The values for tenacity and extension of the artificial silk are as follows:

Tenacity: Dry, 170–175; wet, 100–105.
Extension: Dry, 14.0–15.0; wet, 21.0–23.0.

Example 2

Instead of glycerophosphoric acid an equal quantity of sorbite phosphoric acid may be added with the same result; otherwise the process is carried out according to Example 1. The ester is prepared as follows:

382 parts of sorbite are heated with 214 parts of phosphoric acid at a pressure of 15 mm. Hg for 10 hours to a temperature of 120° C. while stirring. After complete esterification the sorbite phosphoric acid is obtained as a yellowish, syrupous mass.

Example 3

The di(glycerine)boric ester obtained according to the methods given in "Berichte der deutschen Chemischen Gesellschaft", vol. 32, page 3491, has the same efficacy as the glycerine phosphoric acid mentioned in Example 1.

Example 4

The sorbite disulfuric acid ester shows an excellent capability of forming complex compounds. It may be obtained in the following simple manner: 1.82 parts of sorbite are slowly added to 4 parts of concentrated sulfuric acid while stirring and cooling. After heating to a temperature of 50° C. a complete solution takes place. After 20 hours' standing the solution is neutralized with concentrated caustic soda solution, whereby large quantities of sodium sulfate decahydrate separate. After further 24 hours' standing at a temperature of 5° C. the solution is filtered with suction from the sodium salt and may be employed as such.

An analogous effect is obtained when using glycerine disulfuric acid ester.

We claim:

1. In the process for the manufacture of shaped cellulose articles from ammoniacal copper oxide cellulose solutions the step which comprises precipitating the cellulose in an aqueous neutral to alkaline medium in the presence of a compound of the group consisting of polybasic acid esters of polyvalent alcohols and water soluble salts thereof.

2. The process as claimed in claim 1 in which the acid ester of the polyvalent alcohol or water soluble salt thereof is present in the cuprammonium cellulose solution.

3. The process as claimed in claim 1 in which the acid ester of the polyvalent alcohol or water soluble salt thereof is present in the aqueous precipitating bath.

4. The process as claimed in claim 1 in which the ester of a polybasic acid and a polyvalent alcohol or a water-soluble salt thereof is present in the cuprammonium cellulose solution in an amount of from 1 to 10% calculated on the weight of the cellulose.

WILHELM BECKER.
OTTO BAYER.
WALTER HARZ.